United States Patent [19]

Sloughter et al.

[11] 4,264,823
[45] Apr. 28, 1981

[54] WELL LOGGING DIGITAL NEUTRON GENERATOR CONTROL SYSTEM

[75] Inventors: William J. Sloughter; Harold E. Peelman; James R. Bridges, all of Houston, Tex.

[73] Assignee: Halliburton Services, Duncan, Okla.

[21] Appl. No.: 53,628

[22] Filed: Jun. 29, 1979

[51] Int. Cl.³ .............................. G21G 4/02; G01J 1/42
[52] U.S. Cl. ...................................... 250/502; 250/355; 250/499; 250/501
[58] Field of Search ............... 250/499, 500, 501, 355, 250/354, 502

[56] References Cited

U.S. PATENT DOCUMENTS

| | | | |
|---|---|---|---|
| 3,176,136 | 3/1965 | Hopkinson | 250/501 |
| 3,657,539 | 4/1972 | Pierson | 250/355 |
| 3,949,232 | 4/1976 | Langford et al. | 250/501 |
| 4,092,545 | 5/1978 | Langford et al. | 250/501 |

Primary Examiner—Harold A. Dixon
Attorney, Agent, or Firm—John H. Tregoning; William J. Beard

[57] ABSTRACT

A pulsed neutron well logging system using a sealed off neutron generator tube is provided with a programmable digital neutron output control system. The control system monitors the target beam current and compares a function of this current with a preprogrammed control function to develop a control signal for the neutron generator. The control signal is used in a series regulator to control the average replenisher current of the neutron generator tube. The programmable digital control system of the invention also provides digital control signals as a function of time to provide ion source voltages. This arrangement may be utilized to control neutron pulses durations and repetition rates or to produce other modulated wave forms for intensity modulating the output of the neutron generator as a function of time.

7 Claims, 3 Drawing Figures

WELL LOGGING DIGITAL NEUTRON GENERATOR CONTROL SYSTEM

BACKGROUND OF THE INVENTION

This invention relates to pulsed neutron well logging and more particularly to means for controlling the neutron output of a neutron generator tube used in pulsed neutron well logging.

In recent years pulsed neutron well logging has become a commercially important well logging technique. Pulsed neutron techniques have been utilized for measuring the thermal neutron lifetime or thermal neutron decay time of earth formations in the vicinity of a well borehole, for making activation analyses of elemental constituents of the earth formations in the vicinity of the well borehole, for making porosity measurements of the earth formations in the vicinity of the well borehole and for making inelastic neutron scattering measurements for fast neutrons. In each of these well logging techniques the pulsed neutron source used to generate neutron pulses for the physical measurements has typically been an evacuated tube, deuterium-tritium accelerator type source. Other techniques such as those disclosed in U.S. Pat. No. 3,940,611 call for waveforms other than square wave pulses to be produced by a neutron generator tube. The system of the present invention is capable of providing such other waveforms as may be desired.

Such sealed off or evacuated tube neutron sources generally comprises an outer envelope of glass, metal or some other vacuum encapsulation material, such as ceramic, which houses therein the elements of the neutron generator tube. The elements generally comprise a target which is electrically insulated at a high voltage potential, a source of ions which may be accelerated onto the target by its high voltage potential and a pressure regulator or replenisher element which may be used to stabilize or control the amount of pressure of gas within the evacuated outer envelope. Gas pressures of about $10^{-2}$ mm Hg. are typical for the operation of these tubes.

The replenisher or pressure regulator of neutron generator tubes generally comprises a heater element which is surrounded by a surface which is capable of absorbing or emitting gas molecules of the gas filling the evacuated tube envelope as a function of its temperature. The capability of such a surface for emitting or absorbing gases in the tube envelope is controlled by the temperature of a heating element associated with it. When the heating element is elevated in temperature, the surrounding gas impregnated surface is encouraged to dispel absorbed gases by thermal emission. When the heating element is cooled, the surrounding surfaces associated with it are encouraged to absorb gases from the atmosphere inside the evacuated tube envelope. The amount of gas present in the tube envelope controls the amount of gas present in the ion source and hence, the capability of the ion source to produce positively charged ions of gas for acceleration onto the target material.

In a typical neutron generator tube operation, the gas present in the evacuated envelope may be either deuterium gas or a mixture of deuterium and tritium gas. The target material is impregnated with tritium. Thus when deuterium ions are formed in the ion source and accelerated onto the target by its high voltage potential, the electrostatic Coulomb repulsion between the ions being accelerated and the nuclei of the tritium atoms is overcome and nuclear fusion takes place. This produces the unstable isotope helium 5 which immediately decays by the emission of an approximately 14 MEV monoenergetic neutron characteristic of this decay.

A problem which has been associated with the use of such neutron generator tubes in well logging has been that the output of the neutron generator falls off as a function of time as the tritium in the target material is effectively used by the nuclear reactions and by heating of the target. Also high voltage power supply voltage variations, replenisher current variations and ion source emission capability can cause neutron output to vary.

For most well logging operations it is highly desirable that during a given logging run the average neutron output of the tube remain constant and also as high as possible. High output is desirable to promote the nuclear interactions sought to be measured by the well logging technique in use. Consistency of the neutron output is desirable to promote measurement consistency and to avoid systematic errors.

BRIEF DESCRIPTION OF THE INVENTION

The average neutron output of a neutron generator tube is a function of the average target current of the tube. The target current, in turn, is a function of the target high voltage, the ion source voltage and the replenisher heater current. In the present invention, the target high voltage is at a fixed value. The ion source voltage is varied in a preprogrammed manner to produce neutron pulses or other waveforms. By varying the replenisher heater current and hence its heater element temperature, the average neutron output of the tube is controlled. In a preferred embodiment of the present invention, the target beam current is monitored, converted to a voltage signal and compared to a preprogrammed reference voltage control function. An error voltage developed from this comparison is used to control the replenisher current in such a manner that the replenisher current is automatically adjusted to maintain a constant value of the average target beam current corresponding to the reference voltage. A circuit for accomplishing this is provided which may be described as a series regulation replenisher current control circuit. Such a circuit may be used to vary the replenisher heater current or even turn off the replenisher current completely. The circuit embodiments of the present invention provide advantages over prior art control circuits for controlling neutron generator tubes in that improved regulation of the replenisher current is accomplished and a relative simple circuit using few parts is required for this. This replenisher current regulating circuit of the present invention also has a smaller power consumption than those known in the prior art and is capable of operating at temperatures of up to 200° C. An additional feature of the control circuitry of the present invention is the remote turn on or off capability of the neutron generator tube. A further feature of the present invention is the capability of dynamically varying neutron pulse widths and repetition rates or producing dynamically varying neutron output waveforms while maintaining control over the average neutron output of the generator tube.

The foregoing as well as other features and advantages of the present invention are described with particularly in the appended claims. The invention is best understood by reference to the following detailed description thereof when taken in conjunction with the accompanying drawings in which:

DESCRIPTION OF THE PREFERRED EMBODIMENT

Figure 1:
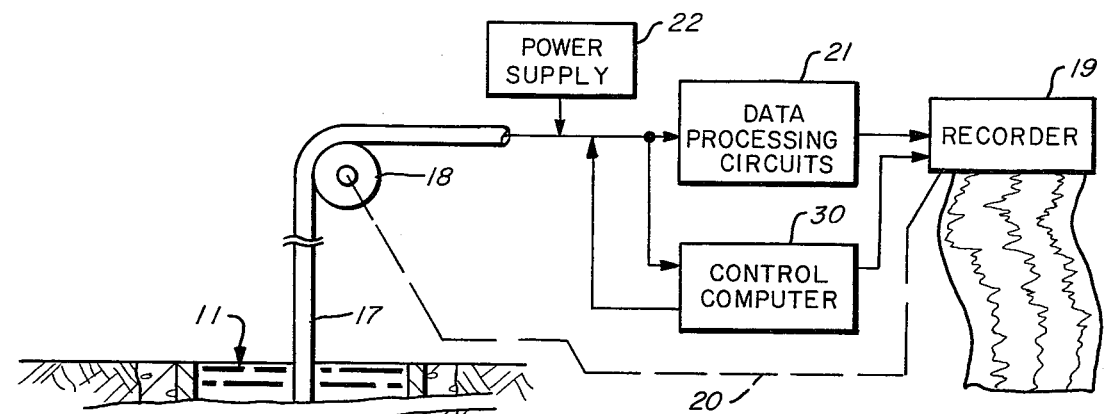
FIG. 1 is a schematic diagram illustrating a well logging system in accordance with the concepts of the present invention and utilizing a pulsed neutron generator.
Figure 1:
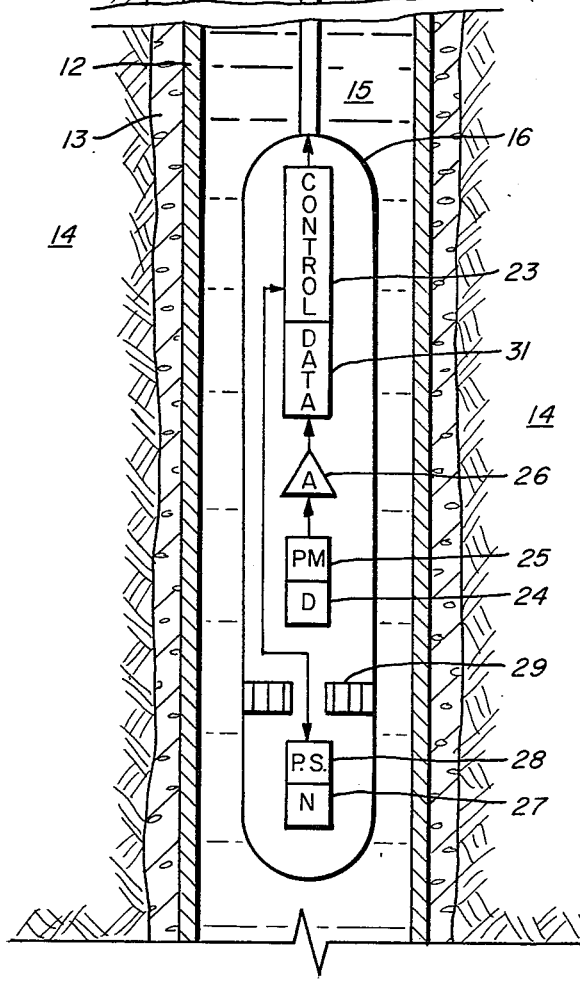

Referring initially to FIG. 1 a well logging system embodying the concepts of the present invention is illustrated schematically. A well borehole 11 is lined with a steel casing 12 and filled with a borehole fluid 15. The steel casing 12 is cemented in place by a cement layer 13 and effectively seals off earth formations 14 from communication with the borehole 11 except in instances where the steel casing and cement layer are perforated for oil production. A fluid tight, hollow body member or sonde 16 is suspended in the borehole 11 by a well logging cable 17 of the usual armored cable type known in the art. The logging cable 17 communicates electrical signals to and from the sonde to surface equipment.

At the surface, the well logging cable 17 passes over a sheave wheel 18 which is electrically or mechanically linked, as indicated by the dotted line 20, to a well logging recorder 19. This linkage enables measurements made by the downhole sonde 16 to be recorded as a function of borehole depth by the recorder 19. Signals from the well logging cable 17 are provided to surface data processing circuits 21 and to a control digital computer 30 which process measurement data to provide information which is supplied to the recorder 19 for recording as a function of borehole depth. Power supply 22, located at the surface, supplies power for the operation of the downhole equipment on cable 17 conductors. The control computer 30 provides digital control signals which will be described in more detail subsequently to the downhole sonde 16 to control the average neutron output thereof and the waveform of the neutron output as a function of time.

In the downhole sonde 16 equipment is provided for making pulsed neutron measurements. While not shown in the schematic drawing of FIG. 1 it will be understood that appropriate power supplies in the downhole instrument convert power source 22, power supplied from the surface into the necessary operating voltages for the equipment in the downhole sonde 16. Control circuits 23, which will be described in more detail subsequently, provide control functions for a neutron generator tube 27 and a high voltage power supply 28 associated therewith and which are located near the lower end of the sonde. Neutron shielding material 29 which may consist of alternate layers of iron, paraffin, cadmium and borated foils or the like is provided to shield the neutron generator 27 from the remainder of the instrumentation within the downhole sonde 16.

A gamma ray detector in the form of a scintillation crystal 24 of thallium activated sodium iodide or the like is optically coupled to a photomultiplier tube 25. This provides for detecting gamma radiation originating in the earth formations in the vicinity of the borehole and resultant from neutron bombardment by the neutron generator 27. As is well known in the art the impingement of gamma rays upon the detector crystal 24 produces light flashes therein whose intensity is proportional to the energy of the gamma ray producing the scintillation. The photomultiplier tube 25 is optically coupled to the detector crystal 24 and amplifies the light flashes produced by the detector crystal 24 and converts them to electrical voltage pulses whose amplitude is proportional to the intensity of the light flashes. These electrical signals are further amplified in an amplifier 26 and conducted into a data transmission circuit 31 where they are appropriately supplied to conventional cable driving circuits (not shown) for transmission to the data processing circuits 21 and the control computer 30 located at the surface of the earth. Control computer 30 may comprise, for example, a small general purpose digital computer such as the Model PDP-11 supplied by Digital Equipment Corporation of Cambridge, Mass.

Figure 3:
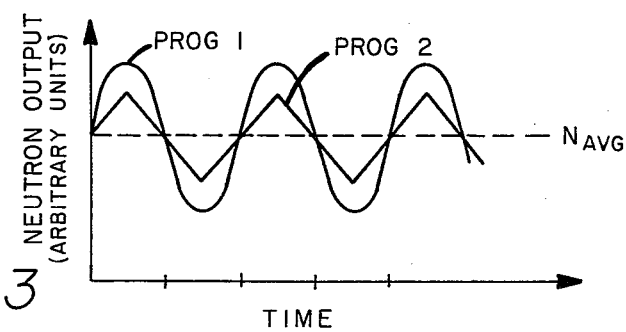
FIG. 3 is a schematic diagram illustrating different waveform neutron outputs of a neutron generator tube controlled in accordance with concepts of the present invention as a function of time.

The neutron output of a neutron generator tube 27 of FIG. 1 is illustrated in FIG. 3 as a function of time. In the illustration two different intensity modulated neutron modes of operation of the neutron generator tube are contemplated. The high voltage power supply is on at all times in the system and modulated waveforms of neutrons as a function of time are produced by applying amplitude and/or frequency modulated voltages to the ion source of the neutron generator. The neutrons are produced by the neutron generator tube 27 as previously described. Voltages of a predetermined amplitude and frequency content are applied as a function of time to the ion-source of the neutron generator tube 41. In this manner the neutron output of the generator tube may be made to vary as indicated in FIG. 3.

The surface control computer 30 monitors the target beam current, as will be described subsequently, and uses the value of this current to control the average value $N_{avg}$ of the neutron output. Moreover, by monitoring the target beam current and the count rate produced by the detector (24, 25 of FIG. 1) the surface control computer 30 can adjust the voltage waveform which is applied to the ion source of the neutron generator to vary logging programs (or waveshapes) if desired or to maintain optimum conditions of pulse width and repetition rate of pulsed (on-off) operation of the generator in a pulsed neutron logging measurement.

In FIG. 3 two different wave shapes are shown for neutron output as a function of time. A first, sinusoidal, modulation is labelled PROG. 1 and a second, sawtooth waveshape, modulation is labelled PROG. 2. These waveshapes of neutron intensity as a function of time are provided by applying the appropriate control voltages to the generator tube ion source as a function of time. Both waveshapes vary about an average neutron output $N_{avg}$. The control circuits to be described in more detail subsequently also control $N_{avg}$ by monitoring the target beam current and comparing this with a reference signal provided by the surface control computer 30 of FIG. 1.

For typical well logging operations the on-time of the neutron generator tube in pulsed mode will usually not exceed a duty cycle of approximately 5–10% of its operating cycle. That is to say, the neutron generator tube will generally only be on from 5–10% of the time and the off periods will occupy approximately 90–95% of its time in a typical well logging operation. Neutron pulse durations of approximately 50 microseconds duration and repetition rates of from 100-20,000 pulses per second are typical for pulsed neutron well logging techniques. For modulated waveshapes the generator will, in general, produce continuous neutron output with intensity varying about an average value $N_{avg}$ as illustrated in FIG. 3.

The neutron generator control system of the present invention operates to maintain the average value $N_{avg}$ of the neutron output at a constant or predetermined value for the duration of a well logging run. Obviously such a system cannot replace tritium in the tube which is used up in generating the neutron output. Long term deterioration of the neutron output is unavoidable in generator tubes which provide only deuterium in the replenisher. Tubes having a dueterium and tritium mixture can avoid such long term neutron output deterioration.

The need for short term control of average neutron output arises from the relationship between the replenisher current and the neutron output, which is a complicated function. Very small changes in the replenisher current can cause very large changes in the neutron output. By monitoring the target current (which is related to the neutron output) and correcting the replenisher current to hold the target current constant, the neutron output may be stabilized for short term variations such as could occur during a well logging job.

Alternatively, it should be noted that the neutron generator 27 could be operated continusouly as modulated as in FIG. 3 for certain types of well logs. In this instance the control system of the present invention would maintain approximately a constant average neutron output $N_{avg}$ from the neutron generator 27 for the duration of a well logging job.

Figure 2:
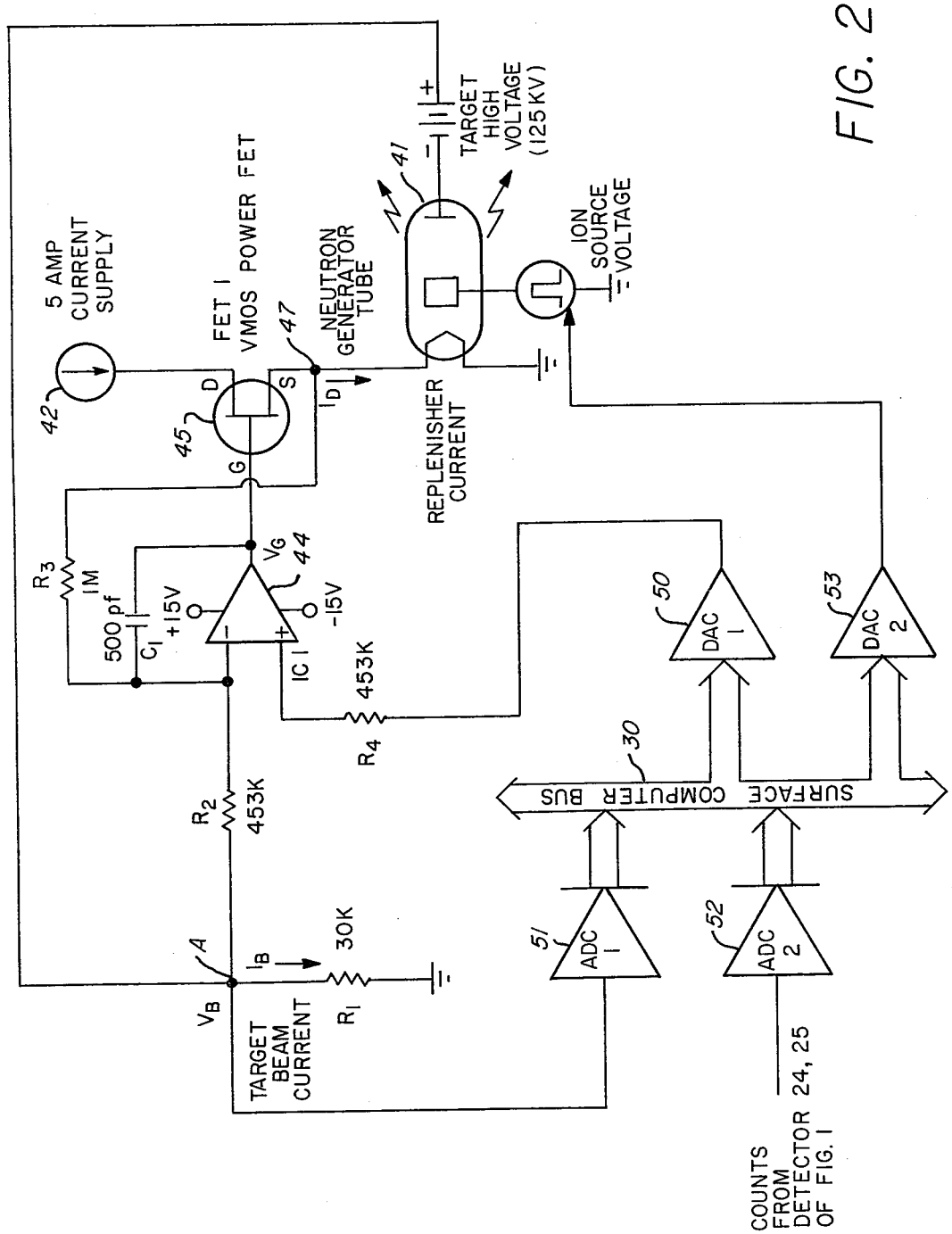
FIG. 2 is a schematic circuit diagram illustrating a programmable digital control system in accordance with the concepts of the present invention.

Referring now to FIG. 2 a portion of the control circuitry 23 of FIG. 1 having to do with the control of the neutron output from a neutron generator tube is illustrated in more detail, but still schematically. Point A of the circuit is connected to the low side of the target high voltage power supply (which may typically be negative 125 kilovolts). The neutron generator tube 41 target beam current (which is sampled at Point A) flows to ground through resistor $R_1$ generating a voltage $V_B$ at Point A which is related to the neutron output of the generator tube. The sampled voltage at Point A is used to regulate the drain current $I_D$ of the VMOS power field effect transistor 45 (labelled FET1). This current is also the replenisher current of the neutron generator tube 41, and is sampled at point 47. The sampled voltage at Point A is converted to digital form by an analog to digital converter 51 and provided to the surface control computer 30. Similarly, counts from the detector 24, 25 of FIG. 1 are converted to digital form by an analog to digital converter 52 and provided to the surface control computer 30. In response to its preprogrammed logic, surface computer 30 provides digital voltage levels to a digital to analog converter 53, as a function of time, for controlling the ion source voltage of neutron generator.

A digital to analog converter 50 converts the digital voltage signal from the computer 30 to analog form and establishes a reference voltage for controlling the average neutron output $N_{avg}$ of the generator tube 41. The magnitude of the reference voltage provided by DAC 50 is determined by the transfer characteristics of the VMOS power FET 45 and the relationship between the replenisher current $I_D$ and the neutron output of the generator tube 41. In general, the transfer characteristics will vary with each FET and generator tube. For the purpose of this description it will be assumed that the desired average neutron output is obtained when the average target beam current is 100 microamperes and the replenisher current is 3 amperes. These are typical values encountered in the operation of neutron generator tubes in well logging usage. In this case, the surface computer 30 would vary the digital voltage value supplied to DAC until the replenisher current is 3 amperes and the target current is 100 microamperes giving a reference voltage $V_B$ at Point A, of 3 volts. This voltage establishes the average operating point of the neutron generator tube 41.

Operational amplifier 44 is connected as an inverting voltage gain circuit with the gain determined by the ratio $R_3/R_2$. The output voltage $V_G$ of the operational amplifier 44 is supplied to the gate of the VMOS power field effect transistor 45. This gate voltage controls the drain current $I_D$ of the field effect transistor 45 which is supplied from a 5 ampere current supply 42. This drain current is sampled at point 47 and fed back through resistor R3 to establish the operating conditions of the operational amplifier 44 as previously described. The non-inverting input of the operational amplifier 44 is connected to the voltage setting provided by surface computer 30 via DAC 50 through resistor $R_4$. This voltage applied to the non-inverting input of the operational amplifier 44 plus the voltage developed across $R_1$ by the target current of generator tube 41 determines the output voltage $V_g$ of the operational amplifier 44.

If the average value of the neutron output $N_{avg}$ begins to decrease below the operating value as determined by the voltage level provided by surface control computer 30, the target beam current will decrease. This will cause the voltage $V_B$ to decrease. When $V_B$ decreases, this causes the output voltage $V_G$ of the operational amplifier 44 to increase. The increased voltage output $V_G$ of the operational amplifier 44 causes the replenisher current $I_D$ to increase. The increase in replenisher current $I_D$ tends to increase the target beam current as sampled at Point A and provided to surface computer 30.

If the neutron output of the generator tube 41 begins to increase above predetermined average operating value $N_{avg}$, the target beam current will increase. This causes the voltage $V_B$ across resistor $R_1$ to increase. When $V_B$ increases, this causes the output voltage $V_G$ of the operational amplifier 44 to decrease. The decrease of $V_G$, the gate voltage of field effect transistor 45, causes the replenisher current $I_D$, as sampled at point 47, to be reduced. This in turn reduces the output of the neutron generator tube 41 by cooling the replenisher heater element.

When the control voltage level provided by surface computer 30 goes to zero volts, the voltage applied to the non-inverting input of operational amplifier 44 goes to zero volts. When zero volts is applied to the non-inverting input of the operational amplifier 44, the voltage output of the operational amplifier is reduced sufficient to insure that the field effect transistor 45 is completely turned off. This interrupts the replenisher current $I_D$ completely and effectively reduces the output of the neutron generator tube 41 to zero. Thus surface control for turning neutron generator 41 on and off is provided.

Similarly, feedback logic contained in surface computer 30 may be used to vary the waveshape of modulated neutron output waveforms from neutron generator tube 41. Count rate information from detector 24, 25 of FIG. 1 is supplied via ADC 52 to the surface computer. Preprogrammed logic responsive to this information and other well logging information supplied to surface computer 30 may be used to vary the neutron output of the generator. For example, information pertaining to the thermal neutron lifetime or thermal neutron decay time of the earth formation in the vicinity of the borehole 11 of FIG. 1 may be determined from detector 24, 25 count rates by the computer 30. This information can be used to control or vary the neutron pulse duration and repetition rates to optimize detector 24, 25 count rates statistically as a function of borehole depth via signals supplied from surface computer 30 to DAC 53. Similarly modulated neutron flux techniques for measuring the thermal neutron decay time and porosity of the formation as disclosed in the aforementioned U.S. Pat. No. 3,940,611 may be implemented via pre-programmed logic included in surface computer 30. Thus a very versatile and powerful tool for investigating nuclear properties of earth formations in the vicinity of a well borehole is provided by the present invention.

The foregoing descriptions may make other alternative embodiments of the invention apparent to those skilled in the art. It is therefore the aim of the appended claims to cover all such changes and modifications as fall within the true spirit and scope of the invention.

We claim:

1. A nuclear well logging system employing a sealed off neutron generator tube having a target, an ion source and a replenisher pressure regulator comprising:
    means for monitoring the average target beam current of said generator tube and for generating a signal representative thereof;
    means for supplying a replenisher pressure regulator current to said generator tube;
    means for monitoring said replenisher pressure regulator current and for forming a second signal as a function of said replenisher pressure regulator current and said target beam current representative signal;
    means for supplying a reference control signal to establish average operating conditions of said generator tube;
    means for comparing said second signal and said reference signal to provide a replenisher current error signal; and
    means, responsive to said error signal, for controlling the magnitude of said replenisher pressure regulator current, thereby to control the average operating conditions of said generator tube.

2. The system of claim 1 wherein said means for supplying a reference control signal comprises means for supplying a digital numerical reference control signal.

3. The system of claim 2 and further including means for converting said digital numerical reference control signal to an analog voltage signal.

4. A nuclear well logging system employing a sealed off neutron generator tube having a target, an ion source and a replenisher pressure regulator, comprising:
    a radiation detector located in spaced relationship to said neutron generator tube for supplying radiation output signals representative of radiation properties of materials in the vicinity of the well logging system;
    means for monitoring the average target beam current of said neutron tube and for generating an output signal representative thereof; and
    digital control means, responsive to said target beam current representative signal, for controlling the average neutron output of said generator tube, and including means for supplying a digital reference control signal as a function of time and means for comparing said representative target beam current signal and said reference control signal to provide an error signal.

5. The system of claim 4 and further including means responsive to said error signal for controlling current flow to said replenisher pressure regulator, thereby controlling the average neutron output of said generator tube.

6. The system of claim 5 wherein said replenisher current flow control means is connected in series circuit relationship with said replenisher pressure regulator.

7. The system of claim 6 wherein said replenisher current flow control means is capable of completely turning off current flow to said replenisher, thereby effectively turning off said neutron generator tube.

* * * * *